United States Patent
Sugesawa et al.

(10) Patent No.: US 7,096,680 B2
(45) Date of Patent: Aug. 29, 2006

(54) VEHICLE AIR CONDITIONER WITH DISCHARGE CAPACITY CONTROL OF COMPRESSOR

(75) Inventors: Naoshi Sugesawa, Kariya (JP); Takeshi Wakisaka, Ichinomiya (JP); Tadashi Nakagawa, Nishikamo-gun (JP); Noboru Takagi, Toyota (JP)

(73) Assignee: DENSO Corporation, Kariya (JP)

( * ) Notice: Subject to any disclaimer, the term of this patent is extended or adjusted under 35 U.S.C. 154(b) by 163 days.

(21) Appl. No.: 10/953,695

(22) Filed: Sep. 29, 2004

(65) Prior Publication Data

US 2005/0066669 A1 Mar. 31, 2005

(30) Foreign Application Priority Data

Sep. 30, 2003 (JP) ............................. 2003-340332

(51) Int. Cl.
- B60H 1/32 (2006.01)
- F25D 21/00 (2006.01)
- F25B 1/00 (2006.01)
- F25B 1/49 (2006.01)

(52) U.S. Cl. .................. 62/133; 62/150; 62/228.4; 62/229; 62/244

(58) Field of Classification Search .................. 62/80, 62/133, 150, 151, 227, 228.1, 228.4, 229, 62/236, 244

See application file for complete search history.

(56) References Cited

U.S. PATENT DOCUMENTS 5,546,754 A * 8/1996 Terao et al. ................. 62/133

6,330,909 B1 * 12/2001 Takahashi et al. ........... 165/202
6,715,303 B1 * 4/2004 Masuda et al. ............... 62/133
2005/0086953 A1 * 4/2005 Sugesawa et al. ............ 62/133

FOREIGN PATENT DOCUMENTS

| JP | 57-44511 | 3/1982 |
| JP | 11-115473 | 4/1999 |
| JP | 2001-105846 | 4/2001 |
| JP | 2003-165331 | 6/2003 |

* cited by examiner

Primary Examiner—Marc Norman
(74) Attorney, Agent, or Firm—Harness, Dickey & Pierce, PLC (57) ABSTRACT

In a vehicle air conditioner having a variable displacement compressor, a control unit calculates a target cooling temperature of air to be cooled by an evaporator, and controls a discharge capacity of the compressor such that a detected air temperature of the evaporator approaches the target cooling temperature. When a deceleration running state of the vehicle is detected, the control unit sets a corrected target cooling temperature lower than the target cooling temperature by a predetermined temperature, and controls the discharge capacity of the compressor such that the detected air temperature approaches the corrected target cooling temperature when the detected air temperature is lower than the corrected target cooling temperature, or controls the discharge capacity of the compressor approximately at the maximum capacity regardless of the corrected target cooling temperature when the detected air temperature is not lower than the corrected target cooling temperature.

8 Claims, 4 Drawing Sheets

VEHICLE AIR CONDITIONER WITH DISCHARGE CAPACITY CONTROL OF COMPRESSOR

CROSS-REFERENCE TO RELATED APPLICATION

This application is related to and claims priority from Japanese Patent Application No. 2003-340332 filed on Sep. 30, 2003, the content of which is hereby incorporated by reference.

BACKGROUND OF THE INVENTION

1. Field of the Invention

The present invention relates to a vehicle air conditioner with a discharge capacity control of a compressor. The vehicle air conditioner performs a cool storage in a cooling heat exchanger during a vehicle deceleration to recover deceleration energy of the vehicle.

2. Description of Related Art

In a conventional vehicle air conditioner, a temperature of air cooled by an evaporator is detected by a temperature sensor, and a driving control of a compressor is performed so that a detected temperature of the temperature sensor becomes a target cooling temperature (e.g., JP-A-57-44511, JP-A-2001-105846). Furthermore, during a vehicle deceleration, the target cooling temperature is decreased more than that before the vehicle deceleration and, an operation ratio (working ratio) of the compressor is increased, so that deceleration energy of the vehicle is recovered.

In this vehicle air conditioner, when a variable displacement compressor is used, the displacement (discharge capacity) of the compressor is gradually increased in accordance with the detected temperature when the target cooling temperature is reduced. Accordingly, when the vehicle deceleration is finished, the discharge capacity of the compressor may be not increased to the maximum capacity, and the deceleration energy cannot be recovered sufficiently.

SUMMARY OF THE INVENTION

In view of the above-described problems, it is an object of the present invention to provide a vehicle air conditioner, which sufficiently recovers deceleration energy of the vehicle.

It is another object of the present invention to provide a vehicle air conditioner, which prevents unpleasant feeling from being given to a passenger in a passenger compartment (compartment) while effectively recovers deceleration energy of the vehicle.

According to the present invention, an air conditioner for a vehicle includes a cooling heat exchanger which cools air to be blown into a compartment of the vehicle, a temperature detecting unit for detecting a temperature of air immediately after being cooled in the cooling heat exchanger, a variable displacement compressor driven by an engine of the vehicle to compress refrigerant after passing through the cooling heat exchanger and to discharge the compressed refrigerant in a refrigerant cycle, a deceleration detecting unit for detecting a deceleration running state of the vehicle, and a control unit which calculates a target cooling temperature of air to be cooled by the cooling heat exchanger and controls a discharge capacity of the compressor such that the temperature detected by the temperature detecting unit approaches the target cooling temperature. Further, the control unit includes a dry determination means for determining whether a surface of the cooling heat exchanger on an air side is dry.

In the vehicle air conditioner, when the deceleration detecting unit detects the deceleration running state of the vehicle, the control unit controls the discharge capacity of the compressor approximately at a maximum capacity, regardless of the target cooling temperature. Specifically, in the deceleration running state of the vehicle, when the surface of the cooling heat exchanger is not dry, the discharge capacity of the compressor is controlled approximately to the maximum capacity. Therefore, the deceleration energy of the vehicle can be sufficiently recovered. In contrast, when the dry determination means determines that the surface of the cooling heat exchanger is dry, the control unit controls the discharge capacity of the compressor such that the temperature detected by the temperature detecting unit approaches the target cooling temperature, regardless of a detection result of the deceleration detecting unit. Accordingly, it can prevent unpleasant feeling from being given to a passenger in the compartment while the deceleration energy can be effectively recovered.

Alternatively, in the present invention, when the deceleration detecting unit detects the deceleration running state of the vehicle in a case where the dry determination means determines that the surface of the cooling heat exchanger is not dry, the control unit sets a corrected target cooling temperature that is lower than the target cooling temperature by a predetermined temperature. Furthermore, the control unit controls the discharge capacity of the compressor such that the temperature detected by the temperature detecting unit approaches the corrected target cooling temperature when the temperature detected by the temperature detecting unit is lower than the corrected target cooling temperature, or controls the discharge capacity of the compressor approximately at the maximum capacity regardless of the corrected target cooling temperature when the temperature detected by the temperature detecting unit is equal to or higher than the corrected target cooling temperature. Generally, when the temperature detected by the temperature detecting unit is lower than the corrected target cooling temperature, it is estimated that the cool storage can be largely used even when cold is further stored in the cooling heat exchanger. In contrast, when the temperature detected by the temperature detecting unit is equal to or higher than the corrected target cooling temperature, because the discharge capacity of the compressor is controlled to an approximate maximum capacity regardless of the corrected target cooling temperature, the cool storage of the cooling heat exchanger can be effectively performed during the deceleration running state of the vehicle.

Preferably, the deceleration detecting unit detects the deceleration running state of the vehicle based on at least one of a vehicle running speed, an engine rotational speed of the vehicle, an acceleration open degree of the vehicle and a vehicle stop operation signal. More preferably, the dry determination means determines whether the surface of the cooling heat exchanger is dry based on an inside air temperature of the compartment detected by an inside air temperature detecting unit and an inside air humidity of the compartment detected by an air humidity detecting unit.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENT

A preferred embodiment of the present invention will be described hereinafter with reference to the appended drawings.

Figure 1:
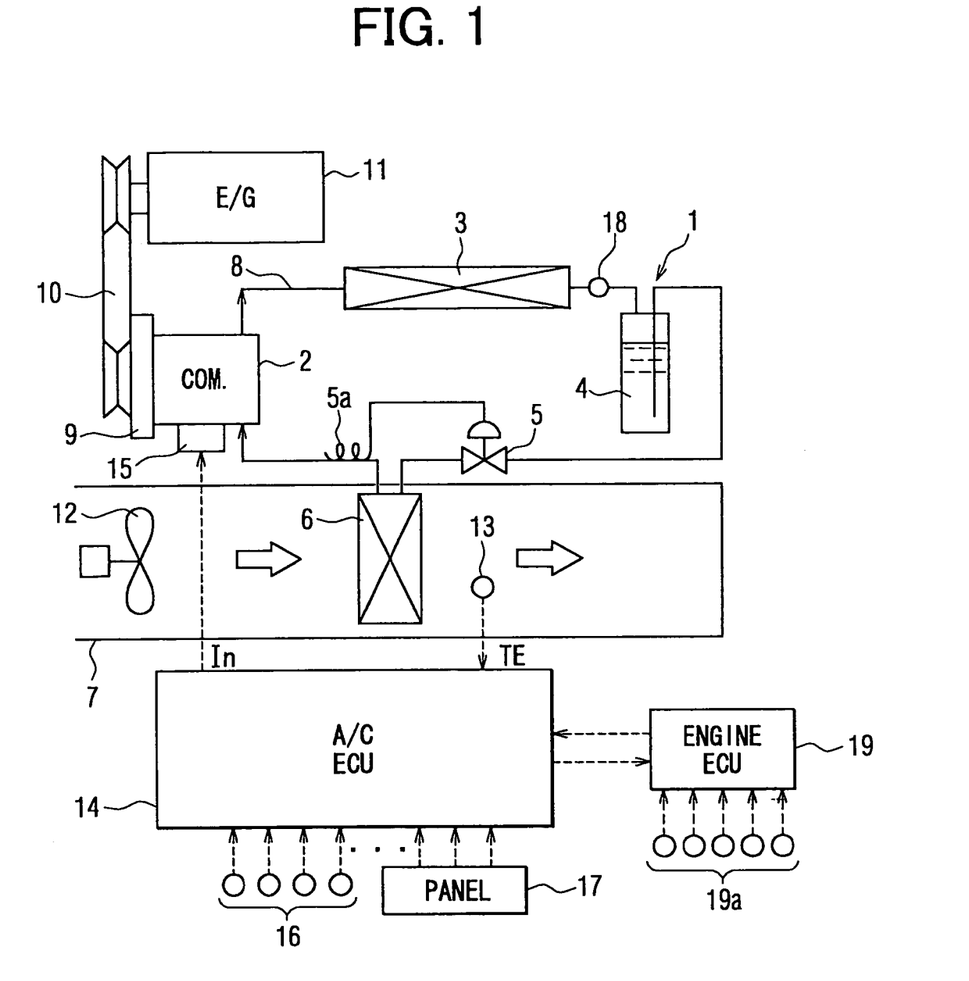
FIG. 1 is a schematic diagram showing a vehicle air conditioner according to a preferred embodiment of the present invention.

As shown in FIG. 1, a refrigerant cycle device 1 of a vehicle air conditioner includes a compressor 2, a condenser 3, a receiver 4 (gas-liquid separator), an expansion valve 5 (decompression device) and an evaporator 6. The compressor 2 sucks, compresses and discharges refrigerant in the refrigerant cycle device 1. Super-heating gas refrigerant having high-temperature and high-pressure is discharged from the compressor 2, and flows into the condenser 3. In the condenser 3, refrigerant is heat-exchanged with outside air blown by a cooling fan to be cooled and condensed.

The refrigerant cooled and condensed in the condenser 3 flows into the receiver 4, and is separated into gas refrigerant and liquid refrigerant in the receiver 4. Generally, surplus refrigerant in the refrigerant cycle device 1 is stored in the receiver 4 as liquid refrigerant. Liquid refrigerant in the receiver 4 is supplied to the expansion valve 5, and is decompressed by the expansion valve 5 to become in a gas-liquid two-phase state. The low-pressure refrigerant from the expansion valve 5 flows into the evaporator 6. The evaporator 6 is a cooling heat exchanger disposed in an air conditioning case 7 for forming an air passage of the vehicle air conditioner. The low-pressure refrigerant flowing through the evaporator 6 is evaporated by absorbing heat from air flowing in the air conditioning case 7. Therefore, air passing through the evaporator 6 is cooled and dehumidified. The refrigerant after passing the evaporator 6 is drawn to the compressor 2.

The expansion valve 5 is a thermal expansion valve having a temperature sensing portion 5a for sensing a temperature of refrigerant at the outlet of the evaporator 6. A valve open degree of the expansion valve 5 is adjusted so that the super-heating degree of refrigerant at the outlet of the evaporator 6 is maintained at a predetermined value. The compressor 2, the condenser 3, the receiver 4, the expansion valve 5 and the evaporator 6 are connected by using the refrigerant piping to construct a closed circuit.

The compressor 2 is driven by an engine for a vehicle running, through a power transmission mechanism 9 and a belt 10. The compressor 2 is a variable displacement compressor. In this embodiment, the power transmission mechanism 9 can be a clutch mechanism (e.g., electronic clutch), which can select a power transmission or a power stop based on an electronic control from an exterior. Alternatively, the power transmission mechanism 9 can be a mechanism without a clutch which always transmits the power.

A blower 12 is provided in the air conditioning case 7. The blower 12 blows inside air (i.e., air inside a passenger compartment) and outside air (i.e., air outside the passenger compartment), which are introduced from an inside/outside air switching box, to the passenger compartment through the air passage of the air conditioning case 7. Specifically, air blown by the blower 12 passes through the evaporator 6 and a heater core (not shown), and is blown into the passenger compartment at least from an air outlet provided in the air conditioning case 7. Generally, the heater core is disposed in the air conditioning case 7 downstream from the evaporator 6 to heat air after passing through the evaporator 6. The heater core is a general hot-water type heater core for heating air using hot water as a heating source.

An evaporator air temperature sensor 13 (temperature detection unit) made of a thermistor is disposed at a direct downstream air side of the evaporator 6 in the air conditioning case 7 to detect an air temperature immediately after passing through the evaporator 6.

As a temperature adjusting means, an air mixing door for adjusting a ratio between an air amount passing through the heat core and an air amount bypassing the heater core, or a hot-water flow control valve for controlling a flow amount of hot water flowing into the heater core, can be used. At a downstream end side of the air conditioning case 7, plural air outlets such as a face air outlet, a foot air outlet and a defroster air outlet port are provided. The plural air outlets are opened and closed by an air outlet mode switching door. Conditioned air after being temperature-controlled by the temperature adjusting means is blown toward the upper body of a passenger in the passenger compartment through the face air outlet, is blown toward the foot area of the passenger in the passenger compartment through the foot air outlet, and is blown toward an inner surface of a windshield through the defroster air outlet.

The compressor 2 includes an electromagnetic capacity control valve 15 that is controlled by an electrical signal from an air conditioning controller 14. In the compressor 2, a control pressure is changed by the control valve 5 so that a discharge capacity of the compressor 2 is changed. That is, the discharge capacity of the compressor 2 is changed externally by changing the control pressure. Detection signals of a sensor group 16 for performing an automatic air-conditioning control and operation signals of an operation switch group of an air conditioning operation panel 17 are input to the air conditioning controller 14.

The sensor group 16 includes an inside air temperature sensor for detecting an inside air temperature inside the passenger compartment, an outside air temperature sensor for detecting an outside air temperature outside the passenger compartment, a solar radiation sensor for detecting a solar radiation amount entering into the passenger compartment, a humidity detection sensor for detecting an air humidity inside the passenger compartment, and a water temperature sensor for detecting a water temperature flowing from the vehicle engine to the heater core. The operation switch group of the air conditioning operation panel 17 includes a temperature setting switch for switching a set temperature in the passenger compartment, an air amount setting switch for setting an air amount to be blown by the blower 12, an air outlet mode selecting switch for selecting an air outlet mode, an inside/outside air selecting switch for selecting inside air or outside air to be introduced from the inside/outside air switching box, and an air conditioning switch for outputting an operation instruction to the compressor 2.

A high-pressure sensor 18 is provided to detect a high-pressure side refrigerant pressure before being decompressed in the refrigerant cycle device 1. That is, the high pressure sensor 18 detects the pressure of high-pressure refrigerant in a high-pressure refrigerant passage 8 from the discharge side of the compressor 2 to an inlet of the expansion valve 5 in the refrigerant cycle device 1. The detected temperature signal of the high-pressure sensor 18 is also input to the air conditioning controller 14. In the example shown in FIG. 1, the high pressure sensor 18 is provided at a refrigerant outlet side of the condenser 3.

The air conditioning controller 14 is connected to an engine controller (engine ECU) 19 on the vehicle side, so that signals communicate with each other between both the controllers 14, 19. The engine controller 19 performs a general vehicle control such as a fuel injection amount and an ignition timing of the vehicle engine 11.

In this embodiment, vehicle information such as an engine rotation speed, a vehicle speed and a throttle open degree or an acceleration open degree is transferred to the air conditioning controller 14, and is used in a deceleration determination for determining a deceleration state, for example. That is, the engine controller 19 is used as deceleration detection means.

Figure 2:
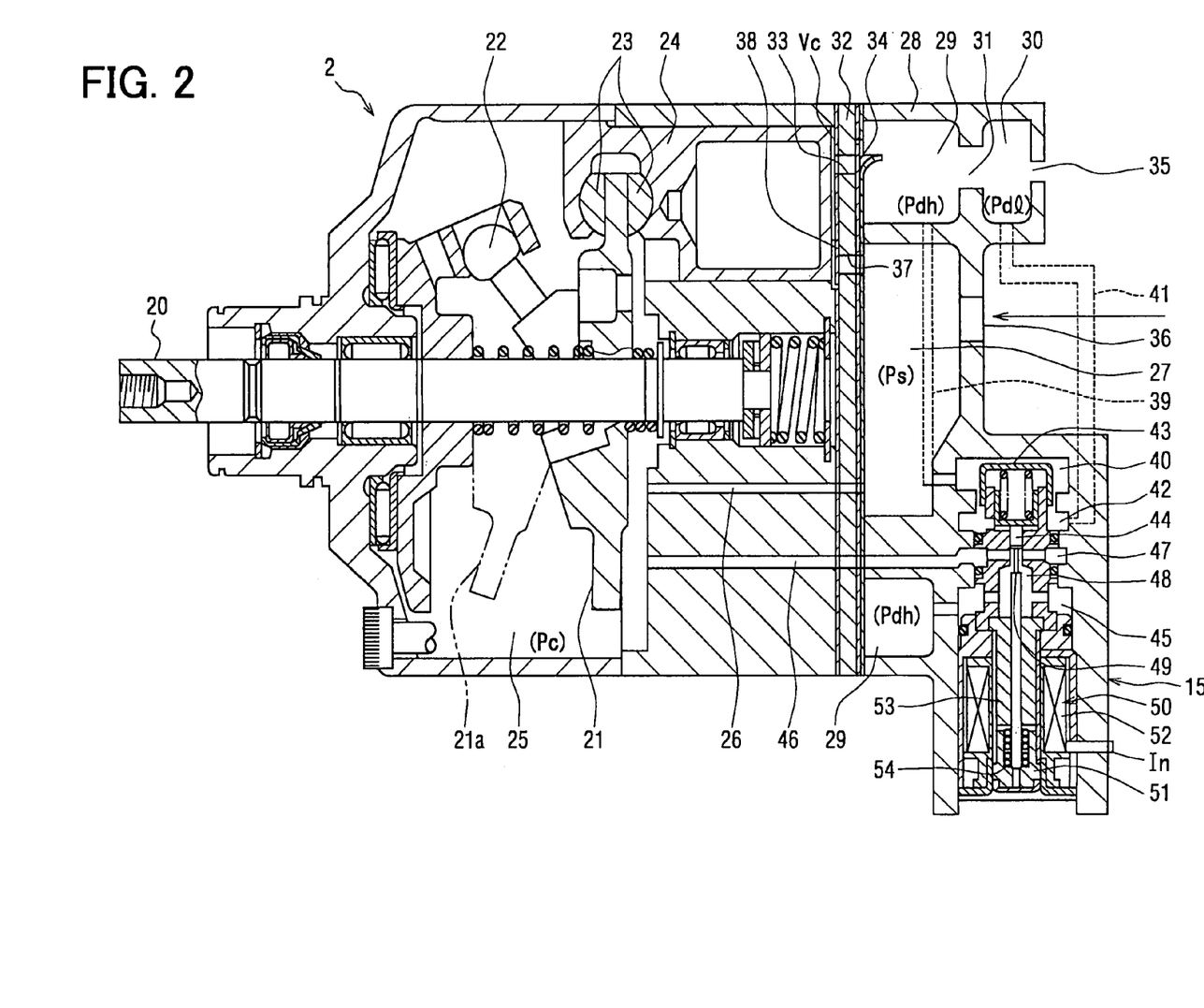
FIG. 2 is a cross-sectional view showing a compressor of the vehicle air conditioner according to the embodiment.

FIG. 2 is a cross-sectional view showing the variable displacement compressor 2 that is a single swash plate type. In the compressor 2, a target flow amount Gro for a compressor discharge flow amount is set by a control current In of the electromagnetic capacity control valve 15. The discharge capacity of the compressor 2 is controlled (increased or decreased) so that the compressor discharge flow amount is maintained at the target flow amount Gro. More specifically, the target flow amount Gro increases in proportion to an increase of the control current In, and the target flow amount Gro decreases in proportion to a decrease of the control current In.

As shown in FIG. 2, power of the vehicle engine 11 is transmitted to a rotation shaft 20 of the compressor 2 through the power transmission mechanism 9 of FIG. 1. A left end of the rotation shaft 20 in FIG. 2 is coupled to the power transmission mechanism 9. A swash plate 21 is connected to be integrally rotated with the rotation shaft 20. A slant angle of the swash plate 21 can be adjusted by a spherical hinge mechanism 22. In FIG. 2, the solid line position of the swash plate 21 shows a state where a slant angle of the swash plate 21 relative to the rotation shaft 20 is small, and the chain line position of the swash plate 21, indicated by 21a, shows a state where the slant angle of the swash plate 21 relative to the rotation shaft 20 is large.

Plural pistons (e.g., 5 pistons) 24 are connected to the swash plate 21 through shoes 23. When the swash plate 21 is rotated integrally with the rotation shaft 20, the plural pistons 24 reciprocate in order, and the volume of a cylinder chamber (operation chamber) Vc is enlarged and reduced, so that refrigerant is sucked and compressed in the compressor 2.

When the discharge capacity of the compressor 2 is changed, the pressure Pc within a crank chamber 25 having therein the swash plate 21 is changed, so that the slant angle of the swash plate 21 is changed and a stroke of the pistons 24 is changed. For example, the piston stroke increases in accordance with an increase of the slant angle of the swash plate 21, and the piston stroke decreases in accordance with a decrease of the slant angle of the swash plate 21.

In this embodiment, the crank chamber 25 is also used as a control pressure chamber for changing the discharge capacity of the compressor 2. The crank chamber 25 communicates with a suction chamber 27 of the compressor 20 through a throttle passage 26.

In contrast, a first discharge chamber 29 and a second discharge chamber 30 are formed in a rear housing of the compressor 2. Furthermore, the first discharge chamber 29 communicates with the second discharge chamber 30 through a throttled communication passage 31 having a predetermined throttle hole diameter. Refrigerant discharged from the operation chamber Vc of each piston 24 flows into the first discharge chamber 29 through a discharge port 33 of a valve plate 32 and a discharge valve 34, and collected in the first discharge chamber 29. Therefore, discharge pulsation of refrigerant can be made smooth. The second discharge chamber 30 is connected to a refrigerant discharge pipe via a discharge port 35.

A suction port 36 for drawing low-pressure gas refrigerant from an outlet of the evaporator 6 and the suction chamber 27 are provided in the rear housing 28. The refrigerant introduced from the suction port 36 flows into the suction chamber 27. Refrigerant from the suction chamber 27 is drawn into the operation chamber Vc through a suction port 37 of the valve plate 32 and a suction valve 38.

While refrigerant flows from the first discharge chamber 29 to the second discharge chamber 30 through the throttled communication passage 31, a pressure loss is generated. Therefore, a pressure Pdl in the second discharge chamber 30 becomes lower than a pressure Pdh in the first discharge chamber 29 by a predetermined amount $\Delta P$ (differential pressure). The differential pressure $\Delta P$ before and after the throttled communication passage 31 changes in accordance with the refrigerant flow amount discharged from the compressor 2.

The control valve 15 is constructed as a discharge capacity control mechanism for controlling the pressure Pc within the crank chamber 25. The control valve 15 is arranged on the rear housing 28 of the compressor 2. Next, a detail structure of the control valve 15 will be explained. The control valve 15 is provided with a first control chamber 40 to which the pressure Pdh of the first discharge chamber 29 is introduced through a communication path 39, and a second control chamber 42 to which the pressure Pdl of the second discharge chamber 30 is introduced through a communication path 41. Both the first and second control chambers 40, 42 are partitioned from each other by a slidable cylindrical member 43. Accordingly, the force due to the differential pressure $\Delta P$ between both the first and second control chambers 40 and 42 is applied to one end portion of the bush rod 44 through the cylindrical member 43 in a valve opening direction.

The control valve 15 further has a discharge pressure chamber 45 to which the pressure Pdh in the first discharge chamber 29 is introduced, and a control pressure chamber 47 communicating with the crank chamber 25 through the communication passage 46. Further, the discharge pressure chamber 45 communicates with the control pressure chamber 47 through a throttle passage 48. An opened sectional area of the throttle passage 48 is adjusted by a valve body 49 of the bush rod 44, so that the pressure of the control pressure chamber 47, that is, the pressure Pc of the crank chamber 25 can be adjusted.

An electromagnetic mechanism portion 50 of the control valve 15 applies a force opposite to the valve opening force due to the differential pressure $\Delta P$, to the valve body 49 (bush rod 44). That is, a valve closing force is applied to the valve body 49 (bush rod 44) by the electromagnetic mechanism portion 50. The valve body 49 is connected integrally with a plunger (movable core) 51 of the electromagnetic mechanism portion 50. An electromagnetic attracting force generated by an exciting coil 52 is applied to the plunger 51. That is, the plunger 51 is arranged opposite to the fixed core member 53 by a predetermined distance. Therefore, the plunger 51 displaces in an axial direction (e.g., upper direction in FIG. 2) toward the fixed core member 53 by the electromagnetic attracting force generated in the exciting coil 52. As a result, the valve body 49 moves in the valve closing direction by the axial displacement of the plunger 51.

A coil spring 54 as an elastic means is disposed between the plunger 51 and the fixed core member 53 to generate an elastic force opposing to the electromagnetic force. By controlling the control current In applied to the exciting coil 52, a predetermined electromagnetic attracting force (i.e., valve closing force of the valve body 49) is applied to the plunger 51. For example, a duty ratio Dt (interrupting ratio) of the control current In applied to the exciting coil 52 is controlled, so that the predetermined electromagnetic attracting force is applied to the plunger 51. The control current In of the exciting coil 52 is controlled by the air conditioning controller 14.

Accordingly, when the valve closing force of the valve body 49 is increased by increasing the control current In, the valve body 49 displaces in the upper direction of FIG. 2 so that the opening area of the throttle passage 48 is reduced. In this case, the pressure of the control pressure chamber 47, that is, the pressure Pc of the crank chamber 25 is decreased, and the slant angle of the swash plate 21 is increased to the position shown by the chain line 21a in FIG. 2, thereby increasing the discharge capacity of the compressor 2.

In contrast, when the valve closing force of the valve body 49 is reduced by controlling the control current In, the valve body 49 moves downwardly in FIG. 2 by the elastic force of the coil spring 54 to increase the open sectional area of the throttle passage 48. In this case, the pressure of the control pressure chamber 47, that is, the pressure Pc of the crank chamber 25 is increased, and the slant angle of the swash plate 21 is decreased to the solid line position shown in FIG. 2, thereby decreasing the discharge capacity of the compressor 2.

When the rotation speed of the compressor 2 increases by an increase of the rotation speed of the engine 11, the refrigerant flow amount discharged from the compressor 2 is increased. Specifically, when the refrigerant flow amount discharged from the compressor 2 increases, the differential pressure AP between the first and second control chambers 40 and 42 becomes larger, and the valve opening force becomes larger. In this case, the bush rod 44 and the valve body 49 move downwardly in FIG. 2, and the open sectional area of the throttle passage 48 is increased. Therefore, the discharge capacity of the compressor 2 becomes increased.

Conversely, when the rotation speed of the compressor 2 decreases by a decrease of the rotation speed of the engine 11, the refrigerant flow amount discharged from the compressor 2 is decreased. Specifically, when the refrigerant flow amount discharged from the compressor 2 decreases, the differential pressure AP between the first and second control chambers 40 and 42 becomes smaller, and the valve opening force becomes smaller. In this case, the bush rod 44 and the valve body 49 moves upwardly in FIG. 2, and the open sectional area of the throttle passage 48 is reduced. Therefore, the discharge capacity of the compressor 2 becomes increased.

In the above operation of the compressor 2, the bush rod 44 and the valve body 49 move to a balanced position between the valve closing force and the valve opening force. Therefore, the discharge capacity of the compressor 2 can be mechanically changed until the differential pressure AP between the first and second control chambers 40 and 42 becomes to a target differential pressure APo that is determined by the valve closing force (electromagnetic attracting force). Here, the target differential pressure APo can be changed by the control of the control current In. Accordingly, the discharge capacity of the compressor 2 can be changed by changing the target differential pressure ΔPo, and the refrigerant flow amount discharged actually from the compressor 2 can be changed.

Next, a basic compressor control process performed by the air conditioning controller 14 will be now described with reference to the flow diagram shown in FIG. 3. First, at step S100, it is determined whether or not the air conditioning switch is turned ON. When it is determined that the air conditioning switch is turned ON at step S100, it is determined whether or not the detected temperature TE of the evaporator air temperature sensor 13 is higher than a wet-bulb temperature Twet by a predetermined temperature A (TE>Twet+A), at step S110.

The wet-bulb temperature Twet is a surface temperature of the evaporator 6 in a state where the surface of the evaporator 6 wets by condensed water. While the surface of the evaporator 6 wets by the condensed water, the detected temperature TE becomes equal to or lower than the wet-bulb temperature. Generally, the wet-bulb temperature Twet is calculated based on the detection values of the inside air sensor and the humidity sensor of the sensor group 16, in accordance with a wet air diagram stored in the air conditioning controller 14.

When the detected temperature TE of the evaporator air temperature sensor 13 is higher than the (Twet+A) at step S110, it is estimated that the surface of the evaporator 6 on the air side is certainly dry. In this case, the control process moves from the step S110 to step S120, without performing the cool storage control. Accordingly, a dry state on the air-side surface of the evaporator 6 can be determined at step S110.

If a cool storage is performed in the evaporator 6 in the dry state where the air-side surface of the evaporator 6 becomes certainly dry, condensed water is generated on the surface of the evaporator 6 after being cold stored. Thereafter, heat corresponding to the cool storage is consumed after finishing the cool storage, and the condensed water adhering on the surface of the evaporator becomes gradually dry. During this operation, smell components adhering on the evaporator 6 is introduced into the passenger compartment, together with the conditioned air. In this case, unpleasant feeling may be given to the passenger in the passenger compartment. However, in this embodiment, when the air-side surface of the evaporator 6 is sufficiently dried, the cool storage control is not performed, thereby preventing a smell generation in the passenger compartment.

When the determination at step S110 is NO, that is, when TE≦Twet+A, it is determined whether or not the vehicle is in a deceleration running state at step S130. Specifically, the deceleration running state of the vehicle is determined based on signals such as the vehicle speed, the engine rotation speed and the acceleration open degree of the sensor group 19a or a vehicle stop signal, which are input through the engine controller 19. For example, the deceleration running state of the vehicle is determined, when the vehicle speed is larger than a predetermined speed a km/h, and when the engine rotation speed Ne is larger than a predetermined rotational speed β rpm, and when the acceleration open degree is equal to or lower than 0 deg.

When the determination at step S110 is YES, or when the determination at step S130 is NO, a general compressor control is performed at step S120. Specifically, at step S120, PID control of the control current In input to the electromagnetic capacity control valve 15 is performed so that the detected temperature TE of the evaporator air temperature sensor 13 becomes a target cooling temperature TEO. The target cooling temperature TEO of the evaporator 6 is calculated based on a target temperature TAO of conditioned air to be blown to the passenger compartment. After the PID control of the control current In is performed at step S120, the control program returns to step S100.

When the determination at step S130 is YES, that is, when the deceleration running state of the vehicle is determined, the target cooling temperature TEO of the evaporator 6 is corrected to a cool-storage target cooling temperature TEOS at step S140. The cool-storage target cooling temperature TEOS is lower than the general target cooling temperature TEO by a predetermined temperature $\gamma°$ C.

Next, at step S150, it is determined whether or not the detected temperature TE of the evaporator air temperature sensor 13 is lower than the cool-storage target cooling temperature TEOS (corrected target cooling temperature TEOS). When the detected temperature TE of the evaporator air temperature sensor TE is lower than the corrected target cooling temperature TEOS at step S150, it is determined that a further cool storage is unnecessary in the evaporator 6. In this case, the PID control of the control current In output to the electromagnetic capacity control valve 15 of the compressor 2 is performed so that the detected temperature TE approaches the corrected target cooling temperature TEOS, at step S160. Then, the control process returns to step S100.

When the detected temperature TE of the evaporator air temperature sensor 13 is equal to or higher than the corrected target cooling temperature TEOS at step S150, it is determined that the cool storage is necessary. In this case, the control current In output to the electromagnetic capacity control valve 15 of the compressor 2 is set at the maximum capacity (In=100%) regardless of the value of the corrected target cooling temperature at step S160. Then, the control process returns to step S100.

According to this embodiment of the present invention, during the vehicle deceleration, the air conditioning controller 14 corrects the general target cooling temperature TEO before the vehicle deceleration to the corrected target cooling temperature TEOS lower than the general target cooling temperature TEO by the predetermined temperature $\gamma°$. Furthermore, when the detected temperature TE of the evaporator air temperature sensor 13 is lower than the corrected target cooling temperature TEOS, the operation of the compressor 2 is controlled so that the detected temperature TE of the evaporator air temperature sensor 13 approaches the corrected target cooling temperature TEOS. In contrast, when the detected temperature TE of the evaporator air temperature sensor 13 is equal to or higher than the corrected target cooling temperature TEOS, the capacity of the compressor 2 is controlled to the maximum capacity regardless of the value of the corrected target cooling temperature TEOS.

Accordingly, the recovered energy in the vehicle deceleration can be made in maximum, in accordance with a necessary state of the cool storage amount. In addition, at step S170 in FIG. 3, the capacity of the compressor 2 is speedily increased without gradually increasing the capacity of the compressor 2. Therefore, the cool storage can be readily performed in maximum. As a result, driving power of the compressor 2 can be effectively reduced after the vehicle deceleration is finished, and fuel consumption efficiency can be improved.

Figure 4:
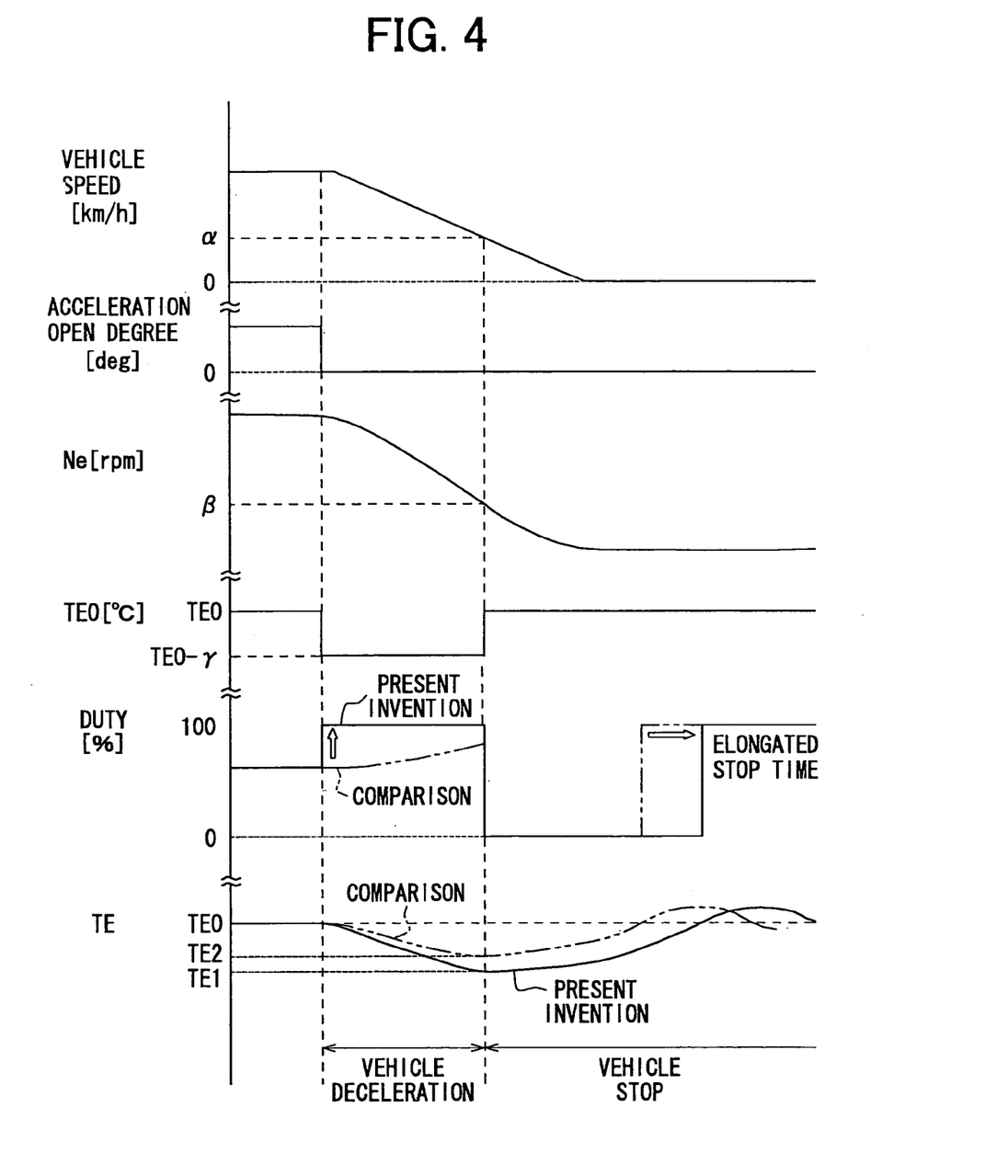
FIG. 4 is a time chart showing an operation example of the vehicle air conditioner according to the embodiment.

FIG. 4 shows a time chart showing an operation example of the vehicle air conditioner of this embodiment and a comparison example. In the present invention, when the deceleration running state of the vehicle is determined based on the vehicle speed, the acceleration open degree and the engine rotation speed Ne, the target cooling temperature TEO before the vehicle deceleration is corrected to be lowered by the predetermined temperature $\gamma$. That is, during the vehicle deceleration running state, the target cooling temperature TEO is corrected to the TEOS (i.e., TEO–$\gamma$). Further, when the detected temperature TE of the evaporator air temperature sensor 13 is not lower than the TEOS, the duty of the control current In is quickly set at 100%. Therefore, the capacity of the compressor 2 is changed quickly to the maximum capacity (100%). In this case, after the end of the vehicle deceleration, the detected temperature TE of the evaporator air temperature sensor 13 is reduced to TE1 shown in FIG. 4, and the cool storage can be sufficiently performed in the present invention.

In contrast, in the comparison example, when the vehicle deceleration running state starts, the duty ratio of the control current In is gradually increased. In this case, after the end of the vehicle deceleration, the detected temperature TE of the evaporator air temperature sensor 13 is reduced to TE2 shown in FIG. 4, which is higher than the TE1. Accordingly, a sufficient cool storage cannot be performed in the comparison example.

In this embodiment, as shown in FIG. 4, a sufficient cool storage can be performed in the deceleration running state of the vehicle, as compared with the comparison example. Accordingly, when the vehicle is stopped after the vehicle deceleration running, a driving restart time of the compressor 2 can be delayed, and the stop time of the compressor 2 can be elongated, as compared with the comparison example.

Although the present invention has been fully described in connection with the preferred embodiment thereof with reference to the accompanying drawings, it is to be noted that various changes and modifications will become apparent to those skilled in the art.

Figure 3:
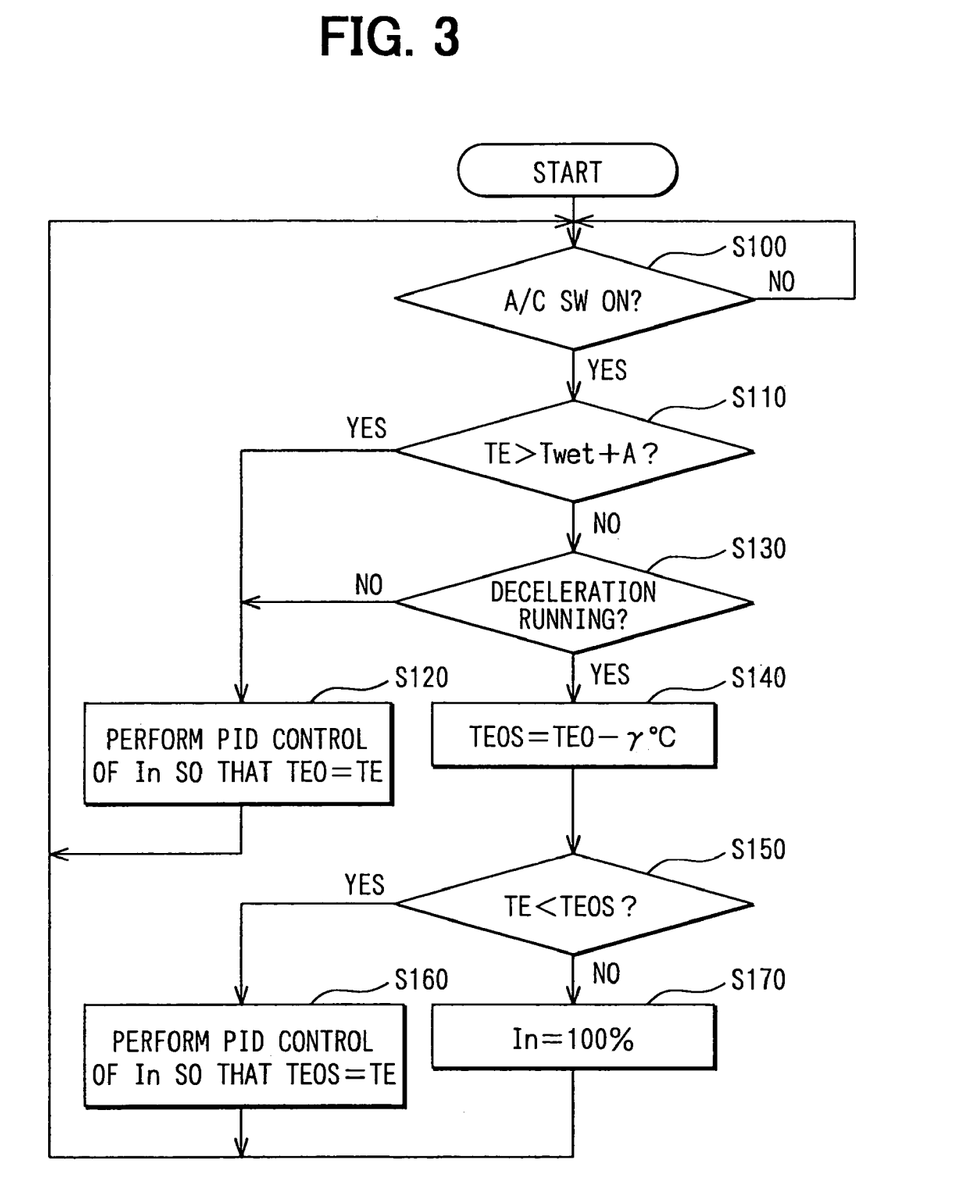
FIG. 3 is a flow diagram showing a compressor control process performed by an air conditioning controller of the vehicle air conditioner according to the embodiment.

For example, in the above-described embodiment, at step S170 in FIG. 3, the control current In is set at the maximum value (100%). However, the control current In can be set at an approximate maximum value at step S170 in FIG. 3. For example, when the operation of the engine have a trouble due to a rapid change of the compressor load, the capacity of the compressor is set at 90-95% of the maximum value at step S170, for example.

In the above-described embodiment, the vehicle deceleration is determined based on the vehicle speed, the engine rotation speed and the acceleration open degree. However, the vehicle deceleration can be determined based on at least one of the vehicle speed, the engine rotation speed and the acceleration open degree. Alternatively, the vehicle deceleration can be determined based on an electrical connection state to a brake lamp, or a vehicle stop signal.

Furthermore, in the above-described embodiment, to prevent a smell generation from the evaporator 6, step S110 shown in FIG. 3 is set. However, the humidity sensor may be omitted, and step S110 in FIG. 3 may be omitted.

In the above-described embodiment, the air conditioning controller 14 is separated from the engine controller 19 to communicate with the engine controller 19. However, the air conditioning controller 14 and the engine controller 19 may be constructed with a single controller.

Such changes and modifications are to be understood as being within the scope of the present invention as defined by the appended claims.

What is claimed is:

1. An air conditioner for a vehicle, comprising:
a cooling heat exchanger which cools air to be blown into a compartment of the vehicle;
a temperature detecting unit for detecting a temperature of air immediately after being cooled in the cooling heat exchanger;
a variable displacement compressor driven by an engine of the vehicle to compress refrigerant after passing through the cooling heat exchanger and to discharge the compressed refrigerant in a refrigerant cycle;
a deceleration detecting unit for detecting a deceleration running state of the vehicle; and
a control unit which calculates a target cooling temperature of air to be cooled by the cooling heat exchanger, and controls a discharge capacity of the compressor such that the temperature detected by the temperature detecting unit approaches the target cooling temperature, wherein:
the control unit includes a dry determination means for determining whether a surface of the cooling heat exchanger on an air side is dry;
when the deceleration detecting unit detects the deceleration running state of the vehicle, the control unit controls the discharge capacity of the compressor approximately at a maximum capacity, regardless of the target cooling temperature; and
when the dry determination means determines that the surface of the cooling heat exchanger is dry, the control unit controls the discharge capacity of the compressor such that the temperature detected by the temperature detecting unit approaches the target cooling temperature, regardless of a detection result of the deceleration detecting unit.

2. The air conditioner according to claim 1, wherein, when the deceleration detecting unit detects the deceleration running state of the vehicle in a case where the dry determination means determines that the surface of the cooling heat exchanger is not dry, the control unit sets a corrected target cooling temperature that is lower than the target cooling temperature by a predetermined temperature, and controls the discharge capacity of the compressor such that the temperature detected by the temperature detecting unit approaches the corrected target cooling temperature when the temperature detected by the temperature detecting unit is lower than the corrected target cooling temperature, or controls the discharge capacity of the compressor approximately at the maximum capacity regardless of the corrected target cooling temperature when the temperature detected by the temperature detecting unit is equal to or higher than the corrected target cooling temperature.

3. The air conditioner according to claim 1, wherein the deceleration detecting unit detects the deceleration running state of the vehicle based on at least one of a vehicle running speed, an engine rotational speed of the vehicle, an acceleration open degree of the vehicle and a vehicle stop operation signal.

4. The air conditioner according to claim 1, further comprising:
an inside air temperature detecting unit for detecting an air temperature inside the compartment; and
an air humidity detecting unit for detecting an air humidity inside the compartment,
wherein the dry determination means determines whether the surface of the cooling heat exchanger is dry based on the air temperature detected by the inside air temperature detecting unit and the air humidity detected by the air humidity detecting unit.

5. An air conditioner for a vehicle, comprising:
a cooling heat exchanger which cools air to be blown into a compartment of the vehicle;
a temperature detecting unit for detecting a temperature of air immediately after being cooled in the cooling heat exchanger;
a variable displacement compressor driven by an engine of the vehicle to compress refrigerant after passing through the cooling heat exchanger and to discharge the compressed refrigerant in a refrigerant cycle;
a deceleration detecting unit for detecting a deceleration running state of the vehicle; and
a control unit which calculates a target cooling temperature of air to be cooled by the cooling heat exchanger, and controls a discharge capacity of the compressor such that the temperature detected by the temperature detecting unit approaches the target cooling temperature, wherein:
in a case where the deceleration detecting unit detects the deceleration running state of the vehicle, the control unit sets a corrected target cooling temperature that is lower than the target cooling temperature by a predetermined temperature, and controls the discharge capacity of the compressor such that the temperature detected by the temperature detecting unit approaches the corrected target cooling temperature when the temperature detected by the temperature detecting unit is lower than the corrected target cooling temperature, or controls the discharge capacity of the compressor approximately at the maximum capacity regardless of the corrected target cooling temperature when the temperature detected by the temperature detecting unit is equal to or higher than the corrected target cooling temperature.

6. The air conditioner according to claim 5, wherein:
the control unit includes a dry determination means for determining whether a surface of the cooling heat exchanger on an air side is dry; and
when the dry determination means determines that the surface of the cooling heat exchanger is dry, the control unit controls the discharge capacity of the compressor such that the temperature detected by the temperature detecting unit approaches the target cooling temperature, regardless a detection result of the deceleration detecting unit.

7. The air conditioner according to claim 6, further comprising:
an inside air temperature detecting unit for detecting an air temperature inside the compartment; and
an air humidity detecting unit for detecting an air humidity inside the compartment,
wherein the dry determination means determines whether the surface of the cooling heat exchanger is dry based on the air temperature detected by the inside air temperature detecting unit and the air humidity detected by the air humidity detecting unit.

8. The air conditioner according to claim 5, wherein the deceleration detecting unit detects the deceleration running state of the vehicle based on at least one of a vehicle running speed, an engine rotational speed of the vehicle, an acceleration open degree of the vehicle and a vehicle stop operation signal.

* * * * *